Patented June 28, 1949

2,474,791

UNITED STATES PATENT OFFICE 2,474,791

NITROALKYL SUBSTITUTED HETEROCYCLIC COMPOUNDS AND PROCESS FOR PREPARING THEM

Murray Senkus, Terre Haute, Ind., assignor to Commercial Solvents Corporation, Terre Haute, Ind., a corporation of Maryland No Drawing. Application February 26, 1945, Serial No. 579,897

10 Claims. (Cl. 260—247)

My invention relates to new nitro amines and to a process for the preparation thereof. Specifically, these new compounds may be represented by the following structural formula:

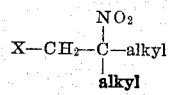

wherein X represents a secondary amino radical selected from the group consisting of 1-pyrrolidyl, 1-morpholyl, 1-thiomorpholyl, 1-piperidyl, 1-(4-alkyl)piperazyl, and 1-(4-aryl)-piperazyl in which the carbon atoms ortho to the 1-N atom are substituted by a group consisting of hydrogen and alkyl.

As examples of nitro amines coming within the scope of the above formula there may be mentioned the following: N-(2-nitroisobutyl)piperidine; N-(2-nitroisobutyl) - 2,5 - dimethylpyrrolidine; N-(2-nitroisobutyl)-morpholine; N-(2-nitroisobutyl)thiomorpholine; N-(2-nitroisobutyl)-N'-phenylpiperazine; N-(2-nitro - 2 - methyl-butyl)-N'-methylpiperazine, and the like.

This application is a continuation-in-part of my co-pending application, Serial No. 455,931 filed August 24, 1942, now abandoned.

Prior investigators in this field have found that primary nitroparaffins would react with N-(hydroxymethyl)dialkylamines; however, they also arrived at the conclusion, while making the aforesaid discovery, that N-(hydroxymethyl)-monoalkylamines would not react with primary nitroparaffins, and that secondary nitroparaffins would neither react with N-hydroxymethyl mono- nor dialkylamines under any of the experimental conditions which they had found to be effective in condensing a primary nitroparaffin with N - (hydroxymethyl) - dialkylamines. Previous workers also were of the opinion, in view of their own experimental results, that neither primary nor secondary nitroparaffins would react with condensation products derivable from formaldehyde and ammonia, formaldehyde and primary alkylamines, formaldehyde and aniline, formaldehyde and diphenylamine, formaldehyde and N-methylaniline, and numerous other products of similar structure prepared from higher molecular weight aldehydes, and primary or secondary amines.

Contrary to that which would normally be expected in view of the above prior art findings, however, I have discovered that nitro amines of the type described may be prepared by reacting formaldehyde with a divalent cyclic amine in which the amino nitrogen forms a part of the ring to form the corresponding N-(hydroxy-methyl)-cyclic amine, which is in turn reacted with an equimolecular amount of a secondary nitroparaffin to produce a nitro amine of the type represented by the generic formula given above.

A modification of the above procedure may frequently be employed to advantage, and consists of reacting the desired amine with a suitable nitro alcohol. A solvent may be used if desired, but in general it will be found that a homogeneous solution can be obtained by agitating the mixture of amine and nitro alcohol. The products, produced by this process, are identical with those synthesized by the first mentioned method; however, the mechanism of the reaction in its initial stages is materially different from that involved in the first procedure. In this connection, it has been observed that primary nitro alcohols, when in the presence of a substance appreciably basic in character, decompose into formaldehyde and the nitroparaffin from which they were derived, and in instances where the basic material happens to be a primary or secondary amine, the liberated formaldehyde reacts therewith to form a N-(hydroxymethyl) amine compound which then reacts with the nitroparaffin, produced by the decomposition of the nitro alcohol, in the same manner as described in the first procedure. The course of the reaction involved may be readily illustrated by the following series of equations:

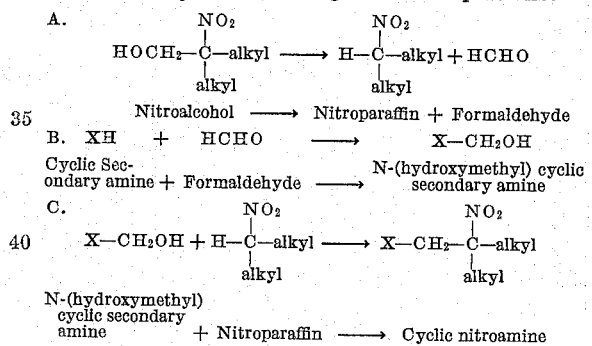

wherein X represents the substituent groups defined previously.

From an examination of the above series of equations it will be evident that although the starting materials are different from those used in the process first described, both procedures may be considered equivalents of one another, since the compounds employed as starting materials in the first process are produced as intermediates in the second, after which said intermediates react in a manner identical with the mechanism involved in the reaction forming the basis of the first mentioned method. Therefore, it is to be specifically understood that the appended process claims include both methods.

The preparation of these nitro amines by either of the above-mentioned methods, is preferably effected at temperatures of from about 25°–30° C. Temperatures above this range may be used, but in doing so care should be exercised to avoid temperatures which cause the formaldehyde to be volatilized from the reaction mixture. In some cases it may be desirable to carry out the reaction in a high pressure reaction vessel. Under such circumstances, substantially higher temperatures may be utilized without loss of formaldehyde, and decomposition of the reactants, or the reaction products.

The amines which may be employed in preparing these new compositions of matter are represented by the formula:

XH, wherein X represents the substituent groups defined previously.

Nitroparaffins that are operative in my process may be represented by the following formula:

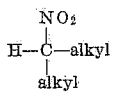

Nitroparaffins typical of this class are 2-nitrobutane, 2-nitropropane, 2-nitropentane, and the like.

In reactions wherein nitro alcohols are employed instead of a nitroparaffin and formaldehyde, the following are examples of typical nitro alcohols which may be utilized: 2-nitro-2-methyl-1-propanol, 2-nitro-2-methyl-1-butanol, 2-nitro-2-ethyl-1-butanol, and the like.

The examples which follow are illustrative of the various types of nitro amines that come within the scope of the present invention. The examples are likewise illustrative of the procedures by which said products may be synthesized. It is to be specifically understood, however, that the following examples in no way limit the scope of my invention with respect to either the product or the process, since I have found that the reaction involved is very general in nature, and will occur, under the conditions described when reacting substantially any secondary nitroparaffin with a primary or secondary amine of the various types enumerated above.

*Example I*

One mole of piperidine and one mole of 2-nitro-2-methyl-1-propanol were placed in a glass-stoppered reaction vessel and the mixture was shaken until it had become homogeneous. The solution was allowed to stand at about 30° C. Water began to separate as a lower layer after about 10 hours. After the separation of water was substantially complete, the top layer containing the product was separated from the lower aqueous layer. Upon fractionation of the crude product, N-(2-nitroisobutyl)piperidine was obtained, corresponding to a conversion of 83%. The nitrogen content found was 15.09% as compared to a theoretical calculated value of 15.05%. The product boiled at 82–83° C. at 0.5 mm. pressure. Under standard conditions it was a solid having a melting point of 20.1° C.

*Example II*

One mole of 2,5-dimethylpyrrolidine and one mole of 2-nitro-2-methyl-1-propanol were placed in a glass-stoppered reaction vessel and the mixture was shaken until it had become homogeneous. The solution was allowed to stand at about 30° C. Water began to separate as a lower layer after about 10 hours. After the separation of water was substantially complete, the top layer containing the product was separated from the lower aqueous layer. Upon fractionation of the crude product, N-(2-nitroisobutyl)-2,5-dimethylpyrrolidine was obtained, corresponding to a conversion of 46%. The nitrogen content found was 14.12% as compared to a theoretical calculated value of 13.99%. The boiling point of the product was 70° C. at 0.5 mm. pressure and $n_D^{20}$ was 1.4622 and $d_{20}^{20}$ was 0.9946.

*Example III*

One mole of morpholine and one mole of 2-nitro-2-methyl-1-propanol were placed in a glass-stoppered reaction vessel and the mixture was shaken until it had become homogeneous. The solution was allowed to stand at about 30° C. Water began to separate as a lower layer after about 10 hours. After the separation of water was substantially complete, the top layer containing the product was separated from the lower aqueous layer. Upon fractionation of the crude product, N-(2-nitroisobutyl)morpholine was obtained, corresponding to a conversion of 24%. The nitrogen content of the product was found to be 14.78% as compared to a theoretical calculated value of 14.89%. The product was a solid having a melting point of 33.0° C.

*Example IV*

105 parts of 2,5-dimethylpyrrolidine were placed in a three-necked reaction vessel equipped with stirrer, dropping funnel and thermometer. To this material in the vessel were added 85 parts of a 35% aqueous formaldehyde solution while agitating. The temperature of the mixture was maintained below 50° C. by external cooling then 100 parts of 2-nitropropane were added and the mixture was stirred at room temperature of about 25° C. for ½ hour whereupon 100 parts of ethyl ether were added and the mixture stirred. The mixture was then allowed to stand whereupon two layers separated. The non-aqueous layer was removed and fractionated. Fractionation resulted in 104 parts of N-(2-nitroisobutyl)-2,5-dimethylpyrrolidine boiling at 78–80° C. at 1 mm. pressure and corresponding to a conversion of 50%.

The nitro amines of my invention are in general either colorless liquids or white waxy solids. The low-molecular-weight nitro amines possess characteristic pungent odors, whereas the high-molecular-weight nitro-amines are relatively odorless. The nitro amines are soluble in ether, methanol, and benzene, but are insoluble in water.

Some of the nitro amines of my invention have been found to be useful as toxicants in insect sprays. They are likewise useful as intermediates in the preparation of numerous organic compounds. Other uses of these products will readily occur to those skilled in the art.

Now having described my invention, what I claim is:

1. N-(2-nitroisobutyl)piperidine.
2. N-(2-nitroisobutyl)-2,5-dimethylpyrrolidine.
3. N-(2-nitroisobutyl)morpholine.
4. In a process for the preparation of N-(2-nitroisobutyl)piperidine, the steps which comprise forming a homogeneous mixture of piperidine, formaldehyde, and 2-nitropropane, permitting the mixture to stand under conditions avoiding loss of formaldehyde until the reaction is complete, and recovering said N-(2-nitroisobutyl)piperidine.

5. In a process for the preparation of N-(2-nitroisobutyl)-2,5-dimethylpyrrolidine, the steps which comprise forming a homogeneous mixture of 2,5-dimethylpyrrolidine, formaldehyde, and 2-nitropropane, permitting the mixture to stand under conditions avoiding loss of formaldehyde until the reaction is complete, and recovering said N-(2-nitroisobutyl)-2,5-dimethylpyrrolidine.

6. In a process for the preparation of N-(2-nitroisobutyl)morpholine, the steps which comprise forming a homogeneous mixture of morpholine, formaldehyde, and 2-nitropropane, permitting the mixture to stand under conditions avoiding loss of formaldehyde until the reaction is complete, and recovering said N-(2-nitroisobutyl)morpholine.

7. In a process for the preparation of nitroamines of the formula:

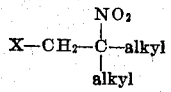

wherein X is a secondary amino radical of the group consisting of 1-pyrrolidyl, 1-morpholyl, 1-thiomorpholyl, 1-piperidyl, 1-(4-alkyl)piperazyl, and 1-(4-aryl)piperazyl, in which the carbon atoms ortho to the 1-N atom are substituted by a group consisting of hydrogen and alkyl, the process which comprises forming a homogeneous mixture of substantially equimolar proportions of formaldehyde, an amine of the group consisting of pyrrolidine, morpholine, thiomorpholine, piperidine, 4-alkyl piperazine, and 4-aryl piperazine, in which the carbon atoms ortho to the 1-N atom are substituted by a group consisting of hydrogen and alkyl, and a nitroalkane having the formula:

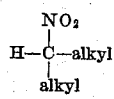

and allowing the mixture to stand under conditions avoiding any substantial loss of formaldehyde until the reaction has taken place, and recovering the nitroamine.

8. Nitroamines having the structural formula:

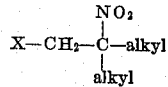

wherein X is a secondary amino group consisting of 1-pyrrolidyl, 1-morpholyl, 1-thiomorpholyl, 1-piperidyl, 1-(4-alkyl)piperazyl, and 1-(4-aryl)piperazyl, in which the carbon atoms ortho to the 1-N atom are substituted by a group consisting of hydrogen and alkyl.

9. The process of claim 7 wherein the formaldehyde and the nitroalkane in said mixture are derived from the decomposition in situ of a nitroalcohol having the formula:

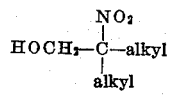

10. The process of claim 7 wherein the reaction is conducted at a temperature within the range of from about 25° to 30° C.

MURRAY SENKUS.

REFERENCES CITED

The following references are of record in the file of this patent:

Chemical Abstracts, 32, 494 (1938), citing:
Cerf De Mauny—Bull. Soc. Chim. [5], 4, pages 1451–68 (1937).